United States Patent

Hansalia

(10) Patent No.: US 7,631,201 B2
(45) Date of Patent: Dec. 8, 2009

(54) SYSTEM SOFTWARE FOR MANAGING POWER ALLOCATION TO ETHERNET PORTS IN THE ABSENCE OF MUTUALLY EXCLUSIVE DETECTION AND POWERING CYCLES IN HARDWARE

(75) Inventor: Rakesh Hansalia, Milpitas, CA (US)

(73) Assignee: Foundry Networks, Inc., San Jose, CA (US)

( * ) Notice: Subject to any disclaimer, the term of this patent is extended or adjusted under 35 U.S.C. 154(b) by 523 days.

(21) Appl. No.: 11/420,456

(22) Filed: May 25, 2006

(65) Prior Publication Data

US 2007/0277049 A1    Nov. 29, 2007

(51) Int. Cl.
*G06F 1/26* (2006.01)
(52) U.S. Cl. .................... 713/300; 713/324
(58) Field of Classification Search ............... 713/300, 713/320, 324
See application file for complete search history.

(56) References Cited

U.S. PATENT DOCUMENTS

| | | | |
|---|---|---|---|
| 5,406,260 A | 4/1995 | Cummings et al. |
| 5,828,558 A | 10/1998 | Korcharz et al. |
| 6,049,471 A | 4/2000 | Korcharz et al. |
| 6,218,930 B1 | 4/2001 | Katzenberg et al. |
| 6,473,608 B1 | 10/2002 | Lehr et al. |
| 6,643,566 B1 | 11/2003 | Lehr et al. |
| 6,839,215 B2 | 1/2005 | Le Creff et al. |
| 6,841,979 B2 | 1/2005 | Berson et al. |
| 6,973,394 B2 | 12/2005 | Jaeger et al. |
| 6,985,713 B2 | 1/2006 | Lehr et al. |
| 6,986,071 B2 | 1/2006 | Darshan et al. |
| 6,992,599 B2 | 1/2006 | Vergnaud et al. |
| 6,996,458 B2 | 2/2006 | Pincu et al. |
| 7,006,815 B2 | 2/2006 | Lehr et al. |
| 7,040,926 B2 | 5/2006 | Ferentz |
| 7,046,983 B2 | 5/2006 | Elkayam et al. |
| 7,068,781 B2 | 6/2006 | Le Creff et al. |
| 7,117,272 B2 | 10/2006 | Rimboim et al. |
| 7,142,951 B2 | 11/2006 | Pincu et al. |
| 7,145,439 B2 | 12/2006 | Darshan et al. |
| 7,146,258 B2 | 12/2006 | Pincu et al. |
| 7,154,381 B2 * | 12/2006 | Lang et al. ............ 340/310.11 |
| 7,155,622 B2 * | 12/2006 | Mancey et al. ............ 713/324 |
| 7,159,129 B2 | 1/2007 | Pincu et al. |
| 7,170,194 B2 | 1/2007 | Korcharz et al. |
| 7,203,849 B2 * | 4/2007 | Dove ...................... 713/300 |
| 7,272,669 B2 | 9/2007 | Mattur et al. |

(Continued)

*Primary Examiner*—Chun Cao
(74) *Attorney, Agent, or Firm*—Bever, Hoffman & Harms, LLP; E. Eric Hoffman

(57) ABSTRACT

A method of allocating power to ports in an Ethernet switch, including: (1) determining the available capacity of a power pool used to supply the ports, (2) assigning a configuration power to each of the ports, (3) selecting a port to be enabled, (4) determining whether the available capacity of the power pool exceeds the configuration power assigned to the selected port, and, if the available capacity of the power pool exceeds the configuration power assigned to the selected port, then (4) subtracting the configuration power assigned to the selected port from the available capacity of the power pool, (5) enabling and powering the selected port and simultaneously detecting whether the selected port is connected to a powered device, and (6) adding the configuration power assigned to the selected port to the available capacity of the power pool if the port is not connected to a powered device.

20 Claims, 3 Drawing Sheets

U.S. PATENT DOCUMENTS

| | | | |
|---|---|---|---|
| 7,337,336 B2 * | 2/2008 | Ferentz et al. | 713/300 |
| 7,340,620 B2 * | 3/2008 | Dove | 713/300 |
| 7,373,528 B2 * | 5/2008 | Schindler | 713/300 |
| 2003/0146765 A1 | 8/2003 | Darshan et al. | |
| 2003/0194912 A1 | 10/2003 | Ferentz | |
| 2004/0236967 A1 | 11/2004 | Korcharz et al. | |
| 2005/0243861 A1 * | 11/2005 | Elkayam et al. | 370/466 |
| 2006/0109728 A1 | 5/2006 | Dwelley et al. | |
| 2006/0112285 A1 | 5/2006 | Stineman, Jr. | |
| 2006/0149978 A1 * | 7/2006 | Randall et al. | 713/300 |
| 2006/0164062 A1 | 7/2006 | Stineman, Jr. et al. | |
| 2006/0164098 A1 | 7/2006 | Su | |
| 2006/0164108 A1 | 7/2006 | Herbold | |
| 2006/0164769 A1 | 7/2006 | Stanford et al. | |
| 2006/0164773 A1 | 7/2006 | Stanford et al. | |
| 2006/0164774 A1 | 7/2006 | Herbold et al. | |
| 2006/0164775 A1 | 7/2006 | Stineman, Jr. et al. | |
| 2006/0165096 A1 | 7/2006 | Heath et al. | |
| 2006/0166706 A1 | 7/2006 | Dwelley et al. | |
| 2006/0168458 A1 | 7/2006 | Stineman, Jr. et al. | |
| 2006/0210057 A1 | 9/2006 | Stanford | |
| 2007/0021094 A1 | 1/2007 | Elkayam et al. | |

* cited by examiner

SYSTEM SOFTWARE FOR MANAGING POWER ALLOCATION TO ETHERNET PORTS IN THE ABSENCE OF MUTUALLY EXCLUSIVE DETECTION AND POWERING CYCLES IN HARDWARE

FIELD OF THE INVENTION

The present invention relates to a power over Ethernet (PoE) system. More specifically, the present invention relates an improved method for pre-allocating power to ports in a PoE system that simultaneously enables and powers the ports in a single, indivisible step.

RELATED ART

In a power over Ethernet (PoE) system, one or more Ethernet devices connected to an Ethernet network are powered over the network cables. Power sourcing equipment located in an Ethernet switch is used to supply the power on the network cables. Ethernet devices which are configured to operate in response to the power supplied on the network cables are commonly referred to as powered Ethernet devices, or simply powered devices (PDs). As defined herein, Ethernet devices which are configured to receive power from a separate power supply (e.g., a conventional 120 Volt AC outlet) will be referred to as non-system powered Ethernet devices.

The power sourcing equipment of a PoE system has a known power capacity, which identifies the amount of power that can be reliably supplied to powered devices coupled to the Ethernet switch. The system software dictates that the PoE power capacity is always treated as limited. The system software must therefore manage the power capacity by controlling the allocation of power to the various ports of the Ethernet switch, in order to avoid overloading the power sourcing equipment (and the associated consequences).

Power allocation has been performed as follows in certain conventional Ethernet switches (such as those commonly available from Linear Technology Corp. (LTC) as part number LTC4259ACGW#PBF). First, the system software performs a search on all of the ports of the Ethernet switch to identify the ports coupled to powered devices, and determine the number of powered devices connected to the Ethernet switch. The hardware in the Ethernet switch allows this step to be performed before providing power to the ports. The system software then attempts to pre-allocate power to the ports that are connected to powered devices, starting with the highest priority port and proceeding to the lowest priority port. The system software would then enable power to be supplied to the ports where power was successfully pre-allocated.

To accomplish this, the system software compares the power required by the highest priority port coupled to a powered device with the remaining power capacity of the power sourcing equipment. If the remaining power capacity (i.e., the power pool) is greater than the power required by this port, then the system software pre-allocates the required power to this port, and enables power to be supplied to this port. This process is performed until all ports coupled to a powered device are enabled to receive power, or until the remaining power capacity of the power sourcing equipment is insufficient to reliably supply power to any more of the powered devices.

In order to pre-allocate power in the above-described manner, the hardware present in the Ethernet switch must include hardware support for initially detecting a powered device on a port, without having to enable power on the port. However, some Ethernet switches do not include such hardware support. For example, some Ethernet switches (such as those commonly available from PowerDsine as part number PD64012G), include hardware that provides a single enable control. In such Ethernet switches, the system software detects the presence of a powered device on a port, and enables power to be supplied to the port in a single, indivisible operation. Thus, power cannot be pre-allocated in these Ethernet switches in the manner described above. Instead, the system software must pre-allocate power assuming that each enabled port is coupled to a powered device (even if none of the enabled ports are coupled to powered devices). Pre-allocating power in this manner will quickly reduce the calculated remaining power capacity to zero. As a result, it may not be possible to enable some ports (even though actual power capacity exists to supply these ports). The software may never address the power needs of these ports. This problem becomes worse in Ethernet switches having a large number of ports (i.e., 192 ports). Note that typical power supply equipment used in an Ethernet switch is not capable of powering 192 ports at the maximum rated power of 15.4 Watts per port.

The Institute of Electrical and Electronic Engineers (IEEE) have promulgated the IEEE 802.3af standard, which defines the operating conditions of PoE systems. To conform with this standard, the system software must pre-allocate power on all ports before enabling power on the ports, regardless of whether powered devices are connected to the ports or not. This ensures that the available power capacity is appropriately managed and avoids overloading the power supply equipment. Failure to pre-allocate power will cause the Ethernet switches of the second type to fail to meet the specifications of the IEEE 802.3af standard.

Moreover, the hardware within an Ethernet switch that implements a single enable control will trip the ports based on hardware priority group. By default, all ports have the same (low) priority, and therefore, all ports are tripped randomly by the hardware. However, if ports are assigned different priorities based on the user configurations, lower priority ports trip first, followed by the next lower priority ports, and so on. Among ports of the same priority, ports are affected randomly.

It would therefore be desirable to have a method for pre-allocating power in an Ethernet switch that detects the presence of a powered device and enables power to the powered device in a single, indivisible operation. It would further be desirable for this method to allocate power in a manner that provides fairness to all ports in the Ethernet switch.

SUMMARY

Accordingly, the present invention provides an improved method for pre-allocating power to the ports of an Ethernet switch that includes hardware that supplies power to a port and detects the presence of a powered device on the port in a single step.

The system software initially determines the available capacity of the power sourcing equipment, and defines this capacity as the initially available power pool. The system software also assigns a configuration power to each of the ports, wherein each configuration power value identifies the maximum power driving capacity of the associated port. The system software also assigns a priority to each of the ports of the Ethernet switch.

As ports are enabled via user commands, the system software compares the configuration power assigned to each port with the available capacity in the power pool. If capacity of the power pool is sufficient to supply the configuration power of the port, the port connection is enabled in hardware, which provides power and detects powered devices in one step. The configuration power allocated to the enabled port is then subtracted from the power pool.

At this point, the hardware encounters two main situations. In one situation, the hardware detects a powered device on the enabled and powered port. In this case, the system software, upon receiving a notification that the powered device was detected, does not have to do anything except change the state of the port to an 'enabled and powered' state, and notify the user. In the other situation, the hardware detects no powered device connected to the enabled port. In this case, the system software, upon determining that no powered device was detected, adds the configuration power that was pre-allocated to the port back to the power pool. As a result, ports that are awaiting power allocation, if any, may again request power. The order in which these ports request power again is based on the priority assigned to these ports.

If, however, the system software determines that the configuration power of the port cannot be pre-allocated from the power pool, then the corresponding port is marked and moved into a new state, which indicates that the port is pending power allocation. Such ports may be subsequently "awakened" if sufficient power becomes available in the power pool (and the port has a high enough priority).

The present invention will be more fully understood in view of the following description and drawings.

DETAILED DESCRIPTION

The present invention provides an improved method for pre-allocating power in a system that uses an Ethernet switch that detects the presence of a powered device and enables power to the powered device in a single, indivisible operation.

Figure 1:
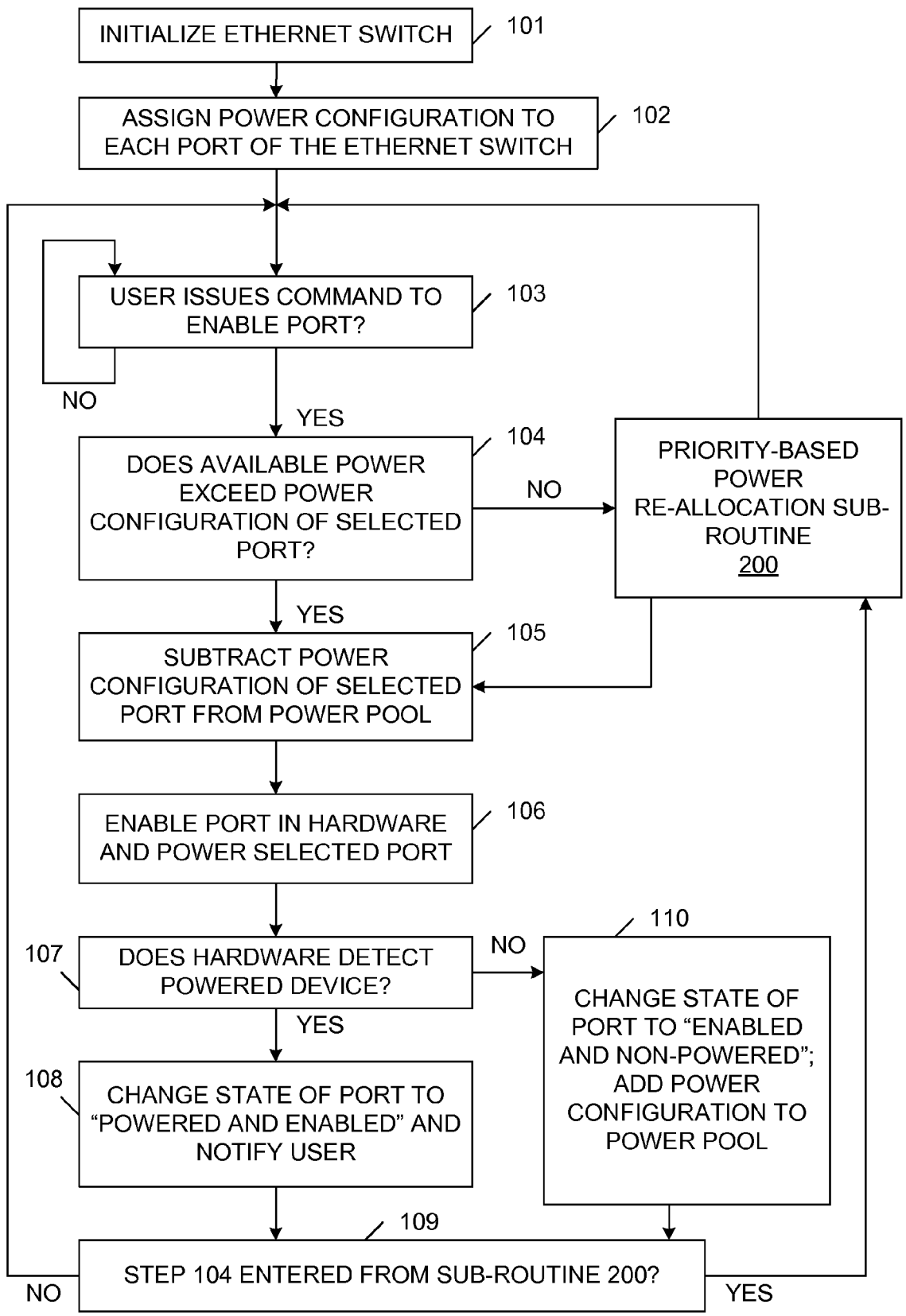
FIG. 1 is a flow diagram illustrating a method of pre-allocating power to the ports of an Ethernet switch in accordance with one embodiment of the present invention.

FIG. 1 is a flow diagram 100 illustrating a method in accordance with one embodiment of the present invention. The Ethernet switch is initialized in Step 101. In general, this initialization step resets the Ethernet switch, determines the amount of power available to supply powered devices (i.e., determines the capacity of the power sourcing equipment, or the size or the 'power pool'), and sets the priority of the various ports. For example, the initial available capacity of the power pool may be 1080 Watts (at 48 Volts).

In Step 102, the user assigns a configuration power to each port of the Ethernet switch. The configuration power is defined as the maximum rated power to be supplied to a port. For example, the user may assign a configuration power of 15.4 Watts to each port of a 192-port Ethernet switch. In an another embodiment, the user may assign a configuration power of 15.4 Watts to a first set of ports, a configuration power of 7 Watts to a second set of ports, and a configuration power of 4 Watts to a third set of ports. The configuration power of the ports is selected in view of the Ethernet devices expected to be connected to the Ethernet switch. The system software is provided with the available capacity of the power pool, the power configuration of each port, and the priority of each port. If the power requirements of a powered device connected to a port exceed the configuration power assigned to the associated port, then the port is shut down.

After the user assigns the configuration power values to the ports, the user may issue a command line interface (CLI) command to the Ethernet switch, thereby instructing the Ethernet switch to enable a port (Step 103, Yes branch). In response to this CLI command, the system software checks the capacity available in the power pool, and determines whether the capacity available in the power pool exceeds the assigned configuration power of the selected port. If the available capacity of the power pool exceeds the configuration power of the selected port (Step 104, Yes branch), then this configuration power is subtracted from the available power pool (Step 105). For example, if the first selected port has a configuration power of 15.4 Watts, then the capacity available in the power pool is reduced by 15.4 Watts.

The selected port is then enabled and powered in a single, indivisible step by hardware present in the Ethernet switch (Step 106). The hardware of the Ethernet switch also determines whether a powered device is detected on the enabled and powered port (Step 107). If a powered device is detected (Step 107, Yes branch), the system software is notified. In response, the system software changes the state of the selected port to an 'enabled and powered' state, and notifies the user of this state (Step 108). Note that the system software does not have to take any action with respect to power allocation, as this has already been taken care of in Steps 104 and 105.

If a powered device is not detected by the hardware in Step 107 (Step 107, No branch), the system software is notified. In response, the system software changes the state of the selected port to an 'enabled and non-powered' state, and notifies the user of this state (Step 110). Because the configuration power assigned to the port is not actually used by the enabled port, the system software adds the configuration power assigned to the port back into the power pool, for use by other ports (Step 110). In the present example, the capacity available in the power pool is increased by 15.4 Watts. Stated another way, the configuration power of the port is effectively set to zero, but the port is still enabled.

Note that an Ethernet switch having an initial power pool capacity of 1080 Watts would be able to supply powered devices on 70 ports at 15.4 Watts/port, with the $71^{st}$ powered device resulting in a load greater than the available capacity of the power pool.

If the user issues a CLI command to enable a port (Step 103), but the configuration power associated with this port is greater than available capacity of the power pool (Step 104, No branch), then processing proceeds to priority-based power re-allocation sub-routine 200. This sub-routine is described in more detail in connection with FIG. 2.

Processing proceeds from Step 108 or Step 110 to Step 109, which determines whether Step 105 was entered from sub-routine 200. If Step 109 was entered from Step 104 (Step 109, No Branch), then processing returns to Step 103, wherein the system waits until the user issues a command to enable another port (Step 103, No branch). If Step 109 was entered from sub-routine 200 (Step 109, Yes branch), then processing returns to sub-routine 200.

Figure 2:
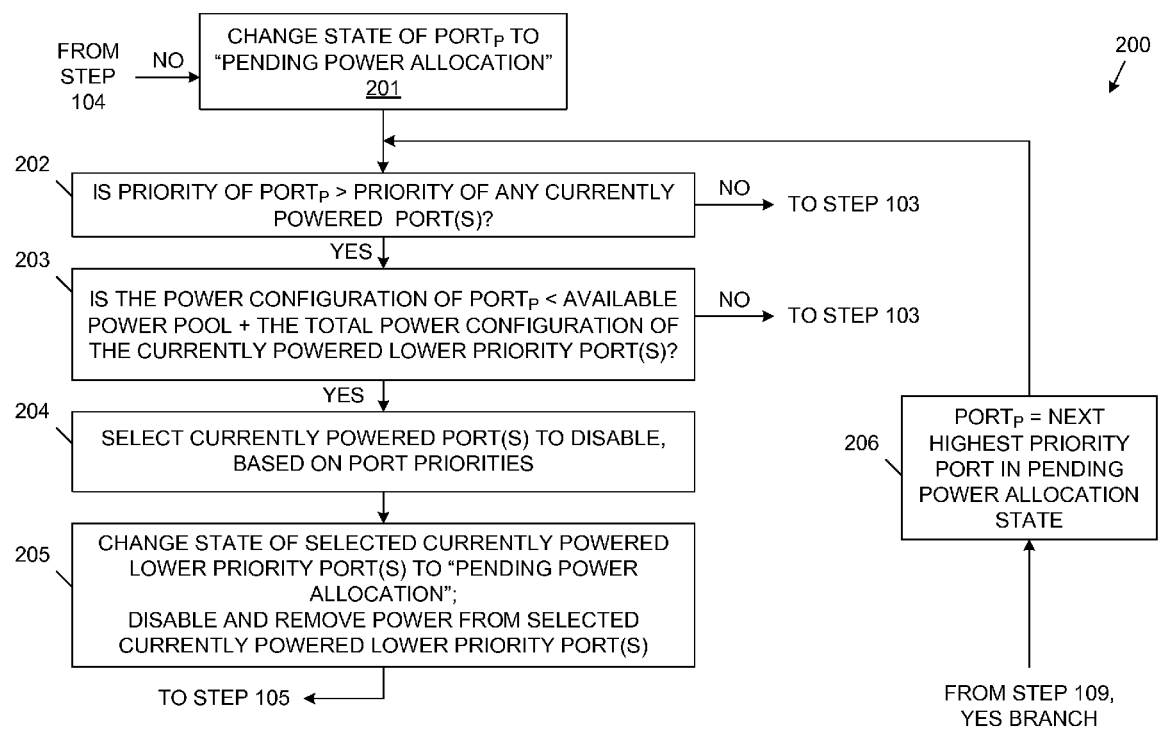
FIG. 2 is a flow diagram illustrating a sub-routine that performs power re-allocation from low priority powered ports to a high priority powered port, in accordance with one embodiment of the present invention.

FIG. 2 is a flow diagram illustrating sub-routine 200 in accordance with one embodiment of the present invention. In general, sub-routine 200 performs power re-allocation which may be necessary when a high priority powered port is enabled after a low priority powered port. If the user issues a CLI command to enable a port (Step 103), but the configuration power associated with this port is greater than the available capacity of the power pool (Step 104, No branch), then processing proceeds to Step 201 of sub-routine 200. In Step 201, the software changes the state of the port (PORT$_P$) to a "pending power allocation" state.

The software then determines whether the priority assigned to PORT$_P$ is greater than the priority assigned to any port in the "enabled and powered" state (Step 202). If so, it may be possible to re-allocate power from the lower priority powered ports to the higher priority port PORT$_P$.

If the priority of PORT$_P$ is greater than the priority of one or more enabled and powered ports (Step 202, Yes branch), then the software determines whether the total power configuration of all such lower priority ports plus the available power in the power pool exceeds the power configuration of PORT$_P$ (Step 203). If so (Step 203, Yes branch), the system software determines which of the currently powered port(s) should be disabled to provide power for the current port PORT$_P$ (Step 204). This determination is based on priority of the currently powered port(s), with the lowest priority port(s) selected first. The system software changes the state of the selected lower priority "enabled and powered" ports to the "pending power allocation" state, and disables and removes power from these ports (Step 205). After the power has been recovered and added to the available power pool, processing proceeds to Step 105, thereby allowing the current port PORT$_P$ to be enabled and powered in the manner described above in connection with FIG. 5.

After the current port has been enabled and powered, processing returns to sub-routine 200 from the Yes branch of Step 109. More specifically, processing returns to Step 206 within sub-routine 200, wherein the software selects the pending power allocation port having the next highest priority to be the next current port PORT$_P$. Processing then returns to Step 202. In this manner, the software loops through all ports in the "pending power allocation" state, in the order of their priority.

When the priority of the current port PORT$_P$ is not greater than the priority of any currently powered port (Step 202, No branch), processing returns to Step 103 (because it is not possible to re-allocate power at this time).

Similarly, if the system software determines that the combined power configuration of all currently powered lower priority ports plus the available power pool is not greater than the power configuration of the current PORT$_P$ (Step 203, No branch), it is not possible to re-allocate power to the current port PORT$_P$. Note that the software does not ever disable currently powered lower priority ports, unless the software determines that the combined power configurations of these lower priority ports plus the available power pool exceeds the required power configuration of PORT$_P$, and that the re-allocation is feasible.

A port in the 'pending power allocation' state can be subsequently enabled if additional capacity becomes available in the power pool. In accordance with one embodiment, ports in the 'pending power allocation' state may request power. The order in which these ports request power is based on the priority assigned to the ports. Thus, port in the 'pending power allocation' state may be subsequently enabled if capacity becomes available in the power pool, and the priority of the port is high enough.

The available capacity of the power pool may increase in various circumstances. For example, the available capacity of the power pool increases if a previously detected powered device is disconnected, or the user disables a port previously enabled to supply a powered device (i.e., a powered device is powered off). Moreover, the available capacity of the power pool will increase if a low-priority powered device is powered off because it is pre-empted by a high-priority non-powered device (or a high-priority powered device having a lower configuration power). The available capacity of the power pool will also increase if additional power sourcing equipment is added to the Ethernet switch. In accordance with one embodiment, the system software may cause processing to enter Step 104 of FIG. 1 in response to an increase in the available capacity of the power pool.

The available capacity of the power pool may also decrease in various circumstances. For example, the available capacity of the power pool will decrease when a previously disconnected powered device is reconnected on an enabled port, and when a low-priority powered device is awakened on an enabled port.

During power-on of the Ethernet switch, the hardware may detect many port connections. However, in accordance with the present invention, the software will sequentially enable ports based on the assigned priority, the available capacity of the power pool and the configuration power assigned to the ports, rather than simultaneously trying to supply power all ports.

As described above, the system software of the present invention uses a pre-allocation of power scheme as the primary means of controlling the allocation of power to the ports. This scheme therefore operates in accordance with the IEEE 802.3af standard.

Figure 3:
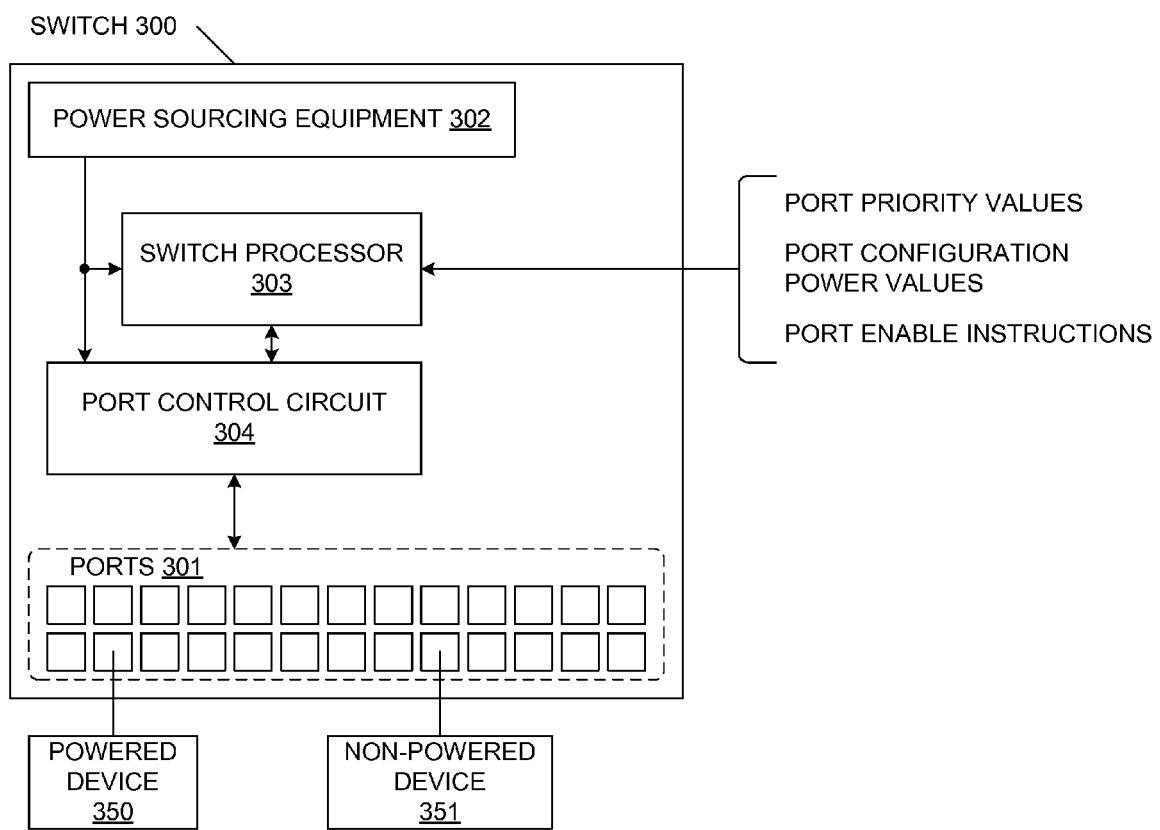
FIG. 3 is a block diagram of an Ethernet switch in accordance with one embodiment of the present invention.

FIG. 3 is a block diagram of an Ethernet switch 300 in accordance with one embodiment of the present invention. Switch 300 includes a plurality of ports 301, power sourcing equipment 302, switch processor 303 and port control circuit 304. Powered device 350 and non-powered device 351 are shown coupled to corresponding ports of switch 300. In an alternate embodiment, power sourcing equipment 302 may be located external to switch 300.

Switch processor 303 receives and stores the port priority values, the port configuration power values and the port enable instructions from the user of switch 300. Switch processor 303 is also coupled to receive and store the total initial power pool capacity from power sourcing equipment 302. In general, switch processor 303 implements the system software functionality described above in connection with FIGS. 1 and 2. That is, switch processor 303 determines the ports to be enabled and powered by port control circuit 304, provides instructions to port control circuit 304 to enable and power the selected ports, receives information from port control circuit 304 that indicates whether the selected ports were actually powered, and maintains an accounting of the available power pool.

Port control circuit 304 is configured to receive the power supplied from power sourcing equipment 302 and the instructions provided by switch processor 303.

In general, port control circuit 304 implements the 'hardware' functions described above in connection with FIGS. 1 and 2. That is, port control circuit 304 enables and powers each selected port in a single indivisible step, detects whether a powered device is present on the selected port after the 'enable and power' step, disables power to the selected port if a powered device is not detected, and then notifies switch processor 303 of the result.

Although the present invention has been described in connection with various embodiments, it is understood that variations of these embodiments would be obvious to one of ordinary skill in the art. Thus, the present invention is limited only by the following claims.

I claim:

1. A method of allocating power among a plurality of ports in an Ethernet switch, comprising:

defining an available capacity of a power pool used for supplying the ports;

assigning a configuration power to each of the ports, wherein the configuration power defines a maximum power to be supplied by each port;

selecting a port to be enabled;

determining whether the available capacity of the power pool exceeds the configuration power assigned to the selected port; and, if the available capacity of the power pool exceeds the configuration power assigned to the selected port, then:

subtracting the configuration power assigned to the selected port from the available capacity of the power pool;

enabling and powering the selected port and simultaneously detecting whether the selected port is connected to a powered device; and adding the configuration power assigned to the selected port to the available capacity of the power pool if the selected port is not connected to a powered device.

2. The method of claim 1, further comprising:

assigning a priority to each of the ports; and selecting the ports to be enabled in an order defined by the priority assigned to the ports.

3. The method of claim 1, further comprising increasing the available capacity of the power pool by adding power sourcing equipment to the Ethernet switch.

4. The method of claim 1, further comprising assigning different configuration powers to different ports.

5. The method of claim 1, further comprising assigning the same configuration power to each of the ports.

6. The method of claim 1, wherein if the available capacity of the power pool does not exceed the configuration power assigned to the selected port, then:

preventing the selected port from being enabled or powered; and assigning the selected port to a pending power allocation state.

7. The method of claim 1, further comprising assigning the selected port to a state that indicates the selected port is enabled and powered if the selected port is connected to a powered device.

8. The method of claim 1, further comprising assigning the selected port to a state that indicates the selected port is enabled but not powered if the selected port is not connected to a powered device.

9. The method of claim 1, further comprising adding the configuration power of the selected port to the available capacity of the power pool if a powered device connected to the selected port is powered off, or is disconnected from the selected port.

10. The method of claim 9, further comprising subtracting the configuration power of the selected port from the available capacity of the power pool if the powered device connected to the selected port is powered on, or is re-connected to the selected port.

11. The method of claim 1, wherein the steps of enabling and powering the selected port and simultaneously detecting whether the selected port is connected to a powered device are performed by hardware within the Ethernet switch.

12. The method of claim 1, wherein the steps of defining the available capacity of the power pool, assigning configuration power, and determining whether the available capacity of the power pool exceeds the configuration power assigned to the selected port to be enabled are performed by software within the Ethernet switch.

13. A method of allocating power among a plurality of ports in a switch, comprising:

defining an available capacity of a power pool;

pre-allocating a configuration power to each of the ports;

removing the pre-allocated configuration power associated with a selected port to be enabled from the available capacity of the power pool;

enabling and powering the selected port and detecting whether the selected port is connected to a powered device; and returning the pre-allocated configuration power associated with the selected port to the available capacity of the power pool upon detecting that the selected port is not connected to a powered device.

14. The method of claim 13, further comprising: determining whether the pre-allocated configuration power associated with the selected port to be enabled is greater than the available capacity of the power pool, and if so, then skipping the steps of removing the pre-allocated configuration power, enabling and powering the selected port, and returning the pre-allocated configuration power.

15. The method of claim 14, further comprising performing the following steps upon determining that the pre-allocated configuration power associated with the selected port is greater than the available capacity of the power pool:

determining whether there is an enabled and powered port having a lower priority than the selected port;

returning the pre-allocated configuration power associated with the lower priority enabled and powered port to the available capacity of the power pool; and then enabling and powering the selected port.

16. The method of claim 15, further comprising removing the pre-allocated configuration power associated with the selected port from the available capacity of the power pool prior to enabling and powering the selected port.

17. The method of claim 16, further comprising:

detecting whether the selected port is connected to a powered device after enabling and powering the selected port; and returning the pre-allocated configuration power associated with the selected port to the available capacity of the power pool upon detecting that the selected port is not connected to a powered device.

18. A switch comprising:

a plurality of ports for data communication, wherein each port is capable of supplying power to an associated powered device;

a processor configured to pre-allocate a configuration power to each of the ports, remove the configuration power pre-allocated to a selected port from an available power pool, and generate a port enable instruction associated with the selected port; and a port control circuit configured to simultaneously enable and power the selected port in response to the port enable instruction, detect whether an associated powered device is coupled to the selected port, and instruct the processor to return the configuration power pre-allocated to the selected port to the available power pool if an associated powered device is not coupled to the selected port.

19. The switch of claim 18, wherein the processor is further configured to assign a priority to each of the ports.

20. The switch of claim 18, further comprising power sourcing equipment for supplying power included in the available power pool.

* * * * *